(12) United States Patent
McFarland et al.

(10) Patent No.: US 9,890,680 B1
(45) Date of Patent: Feb. 13, 2018

(54) LOW-COST, THERMALLY CONTROLLED INLET REDUCTANT DOSING UNIT

(71) Applicant: Continental Automotive Systems, Inc., Auburn Hills, MI (US)

(72) Inventors: Robert Wayne McFarland, Smithfield, VA (US); Keith Aaron Shaw, Yorktown, VA (US); Randolph W Carnell, Jr., Yorktown, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/347,575

(22) Filed: Nov. 9, 2016

(51) Int. Cl.
*F01N 3/04* (2006.01)
*F01N 3/20* (2006.01)
*F01N 9/00* (2006.01)

(52) U.S. Cl.
CPC ............... *F01N 3/208* (2013.01); *F01N 9/00* (2013.01); *F01N 2260/024* (2013.01); *F01N 2610/01* (2013.01); *F01N 2610/03* (2013.01); *F01N 2610/11* (2013.01)

(58) Field of Classification Search
CPC ......... F01N 2610/11; F01N 2610/1453; F01N 2610/146; F02M 53/00; F02M 53/04; F02M 53/043
USPC .................................... 239/132, 132.1, 132.3
See application file for complete search history.

(56) References Cited

U.S. PATENT DOCUMENTS

| | | | |
|---|---|---|---|
| 2015/0027108 A1* | 1/2015 | Winkler | F01N 3/2066 60/295 |
| 2016/0273430 A1* | 9/2016 | Cole | F01N 3/2066 |
| 2016/0348570 A1* | 12/2016 | Willi | F02B 19/18 |

* cited by examiner

*Primary Examiner* — Mark Laurenzi
*Assistant Examiner* — Mickey France

(57) ABSTRACT

A dosing unit for a diesel exhaust treatment system eliminates heat from the exhaust stream using an electrically operated fluid injector inside a cavity, sized and shaped to receive the electrically operated injector therein and surround the fluid injector in the cavity with engine coolant flowing through the cavity. Continuous welds aid heat transfer between the components.

18 Claims, 6 Drawing Sheets

LOW-COST, THERMALLY CONTROLLED INLET REDUCTANT DOSING UNIT

BACKGROUND

Diesel engine exhaust pollutants can be reduced by injecting a treatment fluid into the engine's exhaust stream. Such systems typically use a reductant dosing unit or "RDU" as part of a selective catalytic reduction or "SCR" system. In order for a selective catalytic reduction system to work effectively, however, the dosing device or dosing unit that injects a diesel exhaust fluid (DEF) is preferably operated when the exhaust gas and exhaust system is at elevated temperatures that support hydrolysis and thermolysis. The farther from an engine that an RDU is, the longer it takes for the exhaust gas and exhaust system to elevate to operating temperature, which lengthens the time it takes for a selective catalytic reduction system to work properly. Stated another way, the closer that a reductant dosing unit is to an engine, the more effective it will be.

Locating an RDU close to the engine subjects the device to very high temperatures. Prior art SCR systems therefore surround a diesel exhaust fluid injector with a cooled liquid, typically engine coolant, in order to limit the RDU's internal temperature.

While liquid-cooled diesel exhaust fluid injectors are known, they do not provide heat dissipation to the inlet portion of an RDU, i.e., the portion immediately adjacent to, and frequently inserted into, the exhaust stream of an engine. Extending the coolant jacket completely around the reductant dosing unit would be an improvement over the prior art.

DETAILED DESCRIPTION

Figure 1:
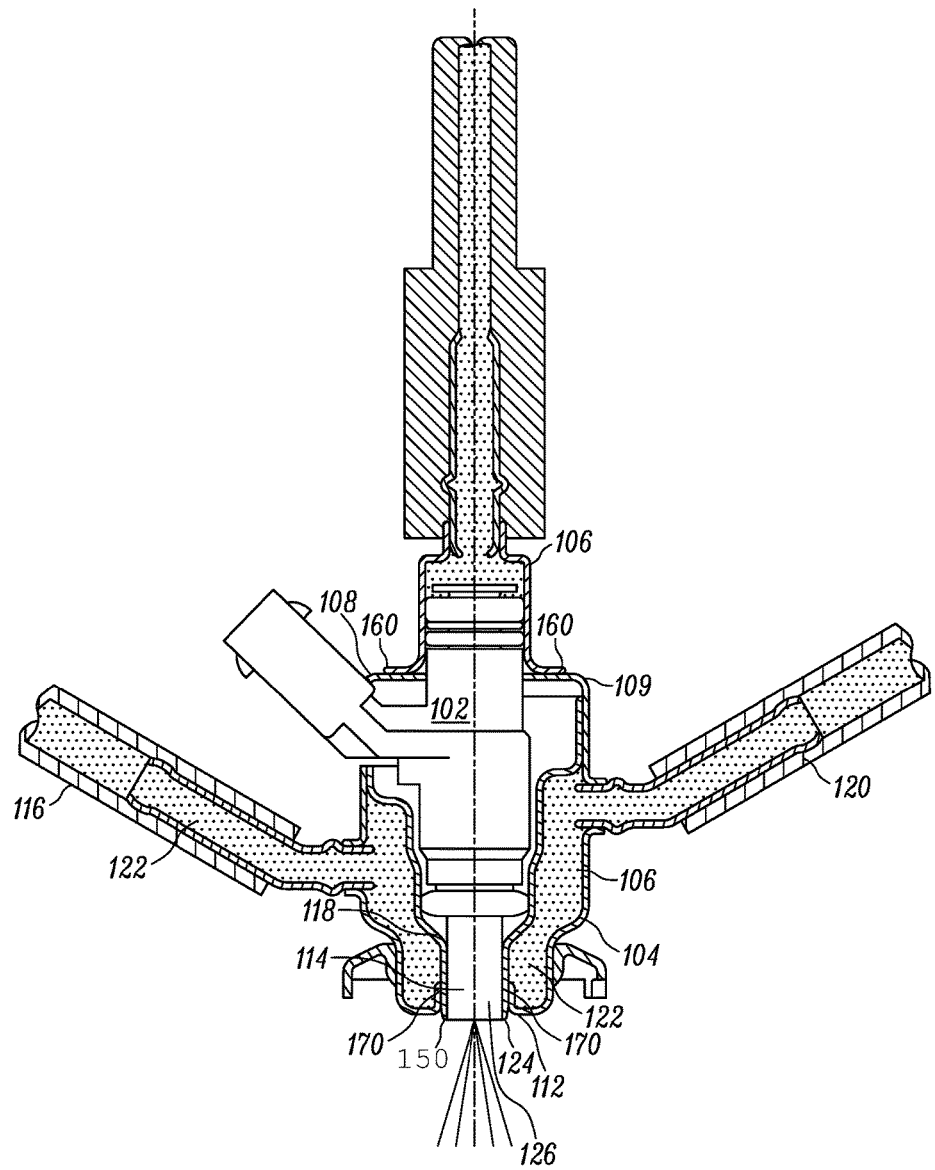
FIG. 1 is a cross-sectional view of a thermally-controlled inlet reductant dosing unit.

FIG. 1 is a cross-sectional view of a thermally-controlled inlet reductant dosing unit 100. The dosing unit 100 comprises an electrically-operated fluid injector 102, preferably a diesel exhaust fluid injector, most of which is located inside a cavity 106 that is inside a coolant housing 104. A cover 106 is welded to a housing flange 108, the flange being located at the top 109 of the housing 104. A first weld 150 is formed around a lower flange 112 of the housing 104 and a tube-shaped output port seal the cavity 106.

The housing 104 and its internal cavity 106 enable engine coolant 122 to flow over and around metal surfaces of the cavity 106, including metal surfaces 118 that are sized, shaped and arranged to make direct and indirect mechanical and thermal contact with the injector 102.

Engine coolant 122 flows into an engine coolant input port 116 of the housing 104, and from there, into the cavity 106 where the coolant 122 absorbs heat from side walls 118 of the cavity 106. The heated coolant, i.e., coolant that is heated by heat that is transferred into the coolant 122 from the injector, flows out of the cavity 106 through a coolant output port 120. Engine coolant is thus continuously flowing into the input port 116 through the cavity 106 and out of the output port 120. Importantly, engine coolant 122 also flows over and around an output orifice 124 of the housing 104, which is sized, shaped and arranged to receive an output port 126 of the injector 102 and make direct mechanical contact with the injector 102. The output port 126 of the injector 102 extends through the lower flange 112 of the housing 104 where they are joined by a continuous weld 150.

Figure 2:
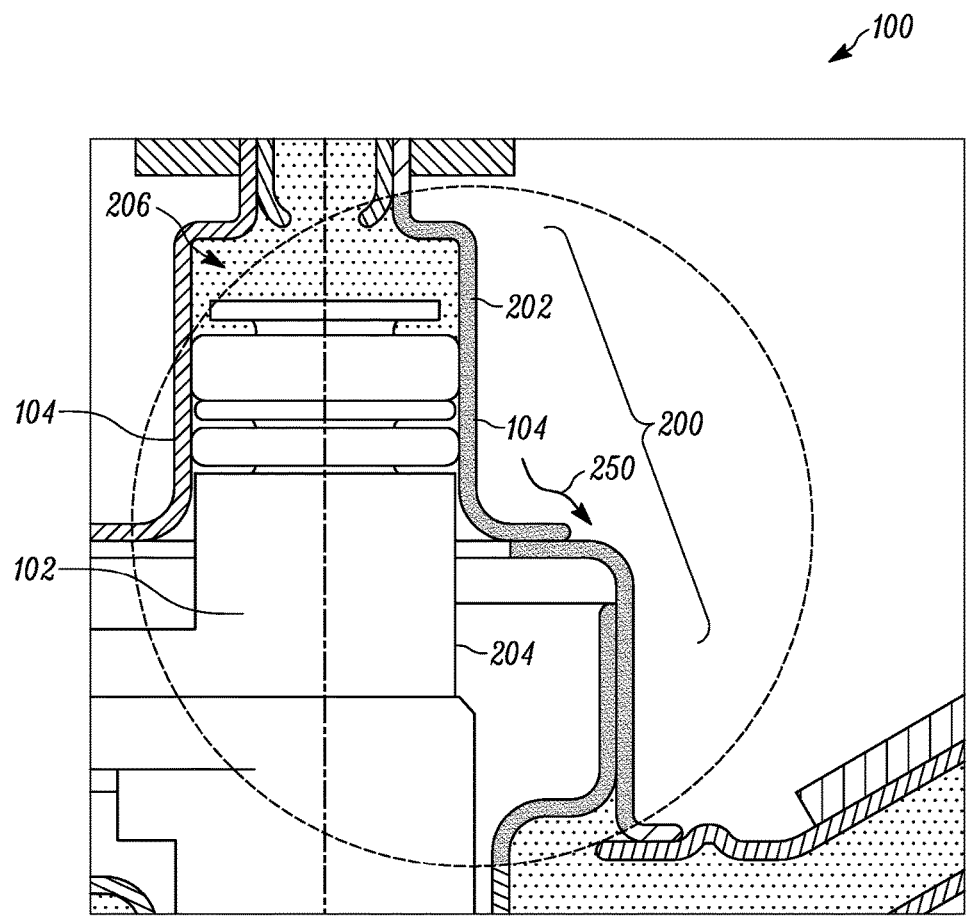
FIG. 2 is an isolated portion of the cross-sectional view shown in FIG. 1, showing portions of a thermal conduction path through which heat from a diesel exhaust fluid is conducted into a coolant.

FIG. 2 is an enlargement of a portion of the interface between the housing and injector. A thermal conduction path 200 comprises the metal side wall 202 of the housing 104 in direct contact with an outside surface 204 of the injector 102. Heat from the diesel exhaust fluid (DEF) 206 that is absorbed by the injector 102, is conducted downwardly, in the direction of the arrow identified by reference numeral 250, and away from the injector 102 to engine coolant flowing through the housing 104 and exiting the outlet port 126.

Figure 3A:
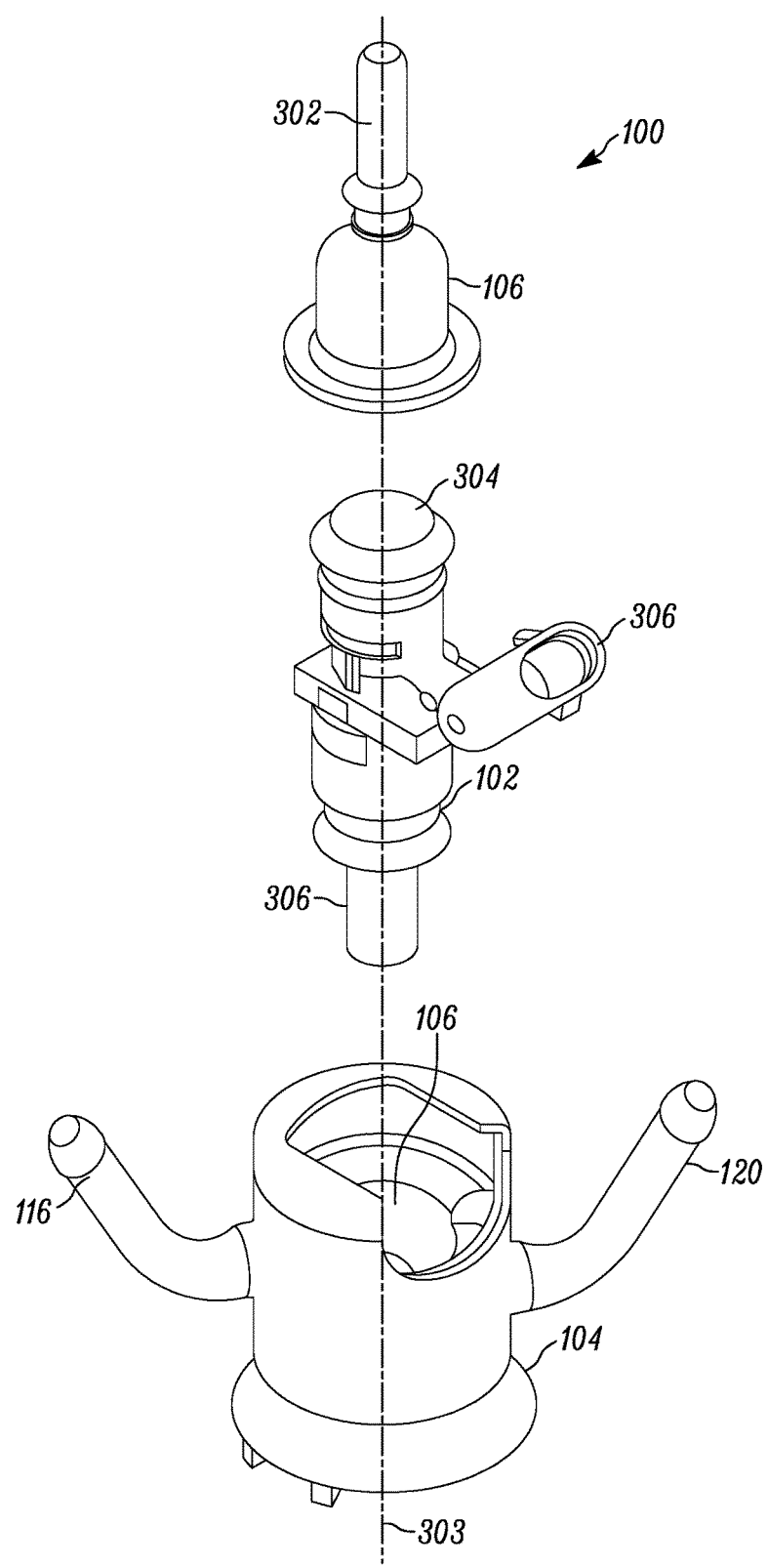
FIG. 3A is an exploded view of the reductant dosing unit shown in FIG. 1.

FIG. 3A is an exploded view of the dosing unit 100. It shows the axial alignment of the injector 102 with the coolant housing 104 and cover 106. The cap, injector and housing have center lines, co-incident with an axis 303.

The cover 106 has an inlet pipe 302 which, as shown in FIG. 1, is sized and shaped to carry diesel exhaust fluid (DEF) to a DEF input port 304 of the injector 102. Electrical signals provided to the injector 102 through a connector 306, not inside the housing 104 and thus not inside the cavity, enable control signals to be sent to the injector 102. Those signals cause the injector to open and close responsive to electrical signals provided to it by a controller, not shown and not pertinent to the invention disclosed herein.

Figure 3B:
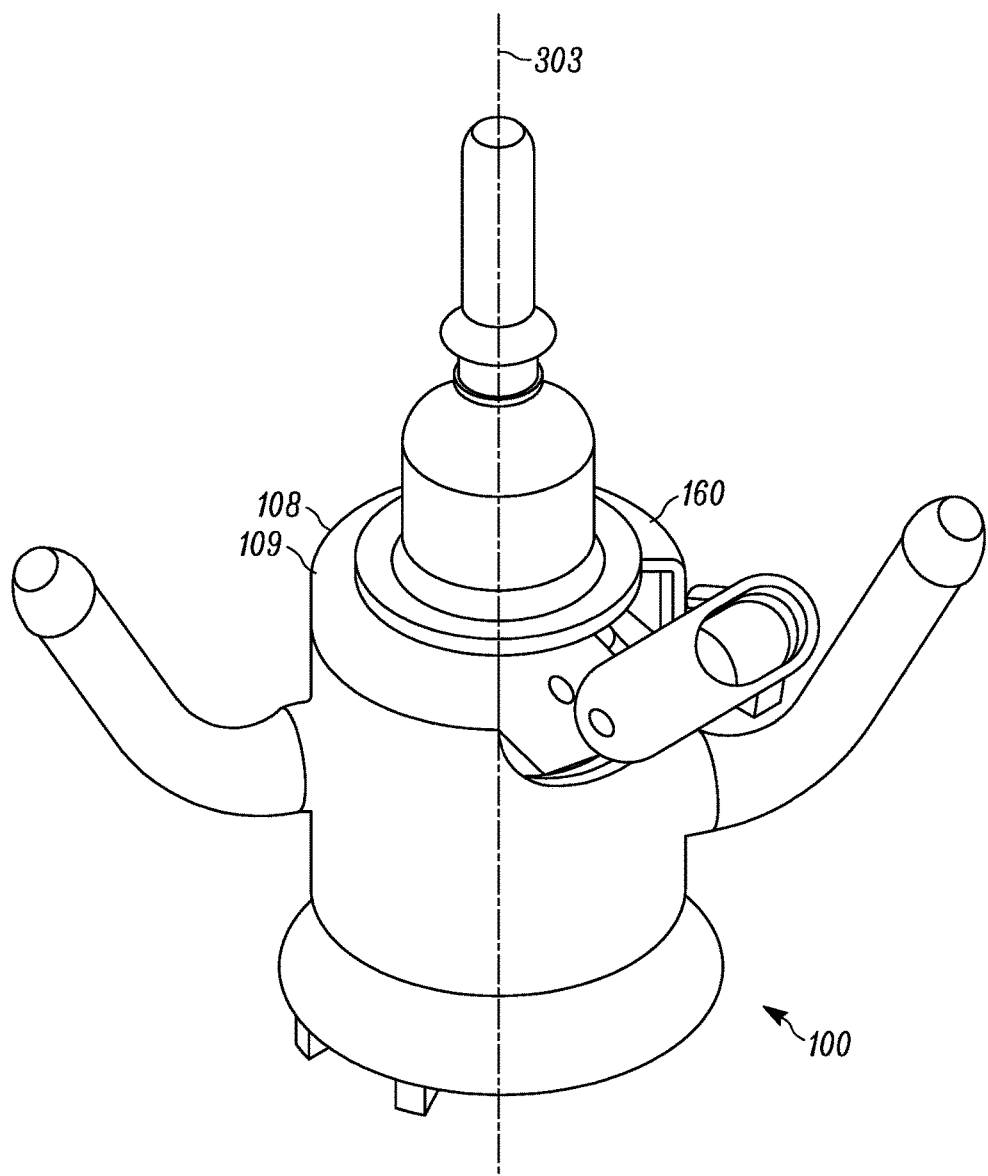
FIG. 3B is a perspective view of the reductant dosing unit.
Figure 4A:
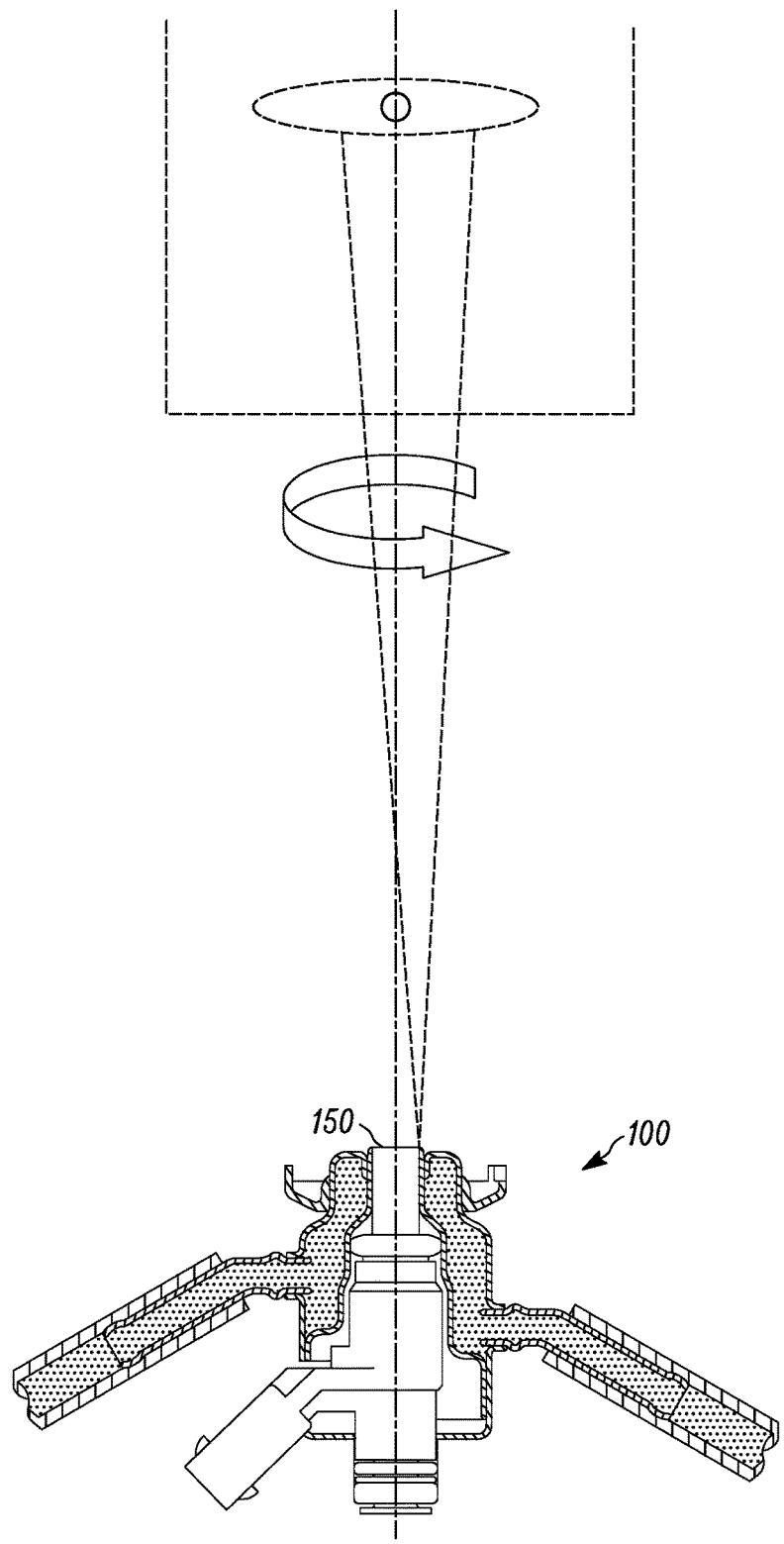
FIGS. 4A and 4B illustrate welding of the diesel exhaust fluid injector portion to a coolant housing and welding of an inlet cap to the housing.
Figure 4B:
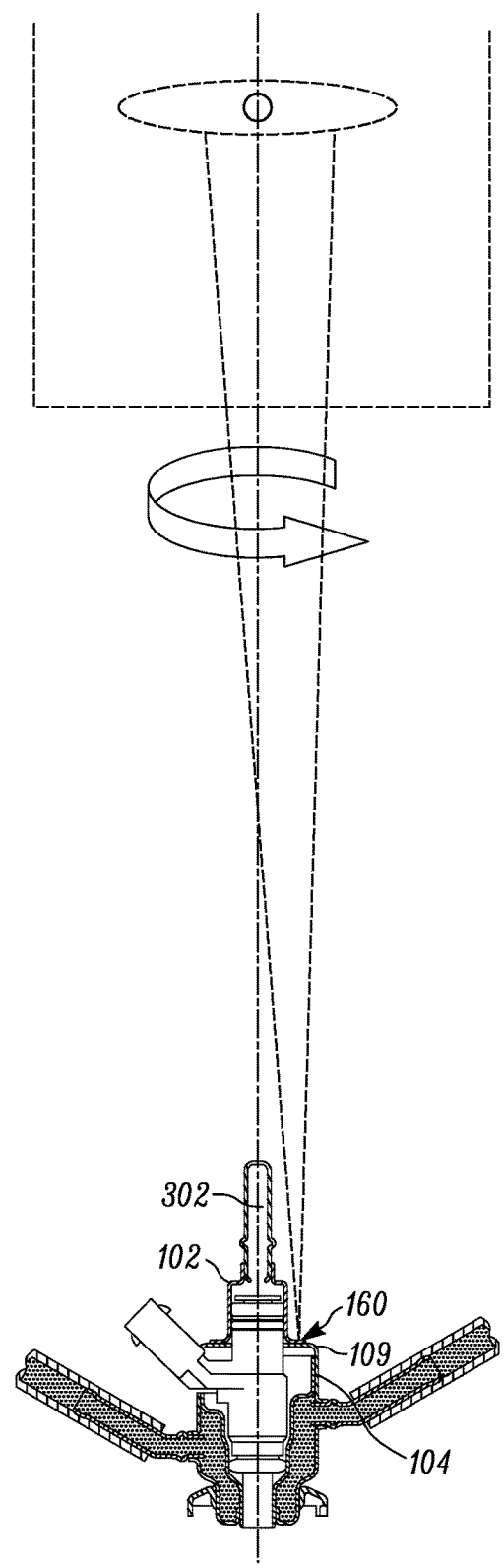

The injector 102 has a DEF output port 306 directly below and aligned with the inlet port 304. Except for the connector 306, the entire injector 102, is inserted into the cavity 106 in the coolant housing 104. The DEF output orifice of the housing is centered and axially arranged and aligned with the DEF input port as well as the output port and output port of the injector 102. It is also aligned with the cover 106 of the cavity. FIG. 3B is a perspective view of the assembled dosing unit 100.

Referring now to FIG. 1, the dosing unit 100 is assembled using a first weld 150 located on the bottom of the dosing unit 100 and which circumscribes the connection of the output port 126 of the injector 102 to the output orifice 124 of the housing 104. A second welds 160 circumscribes the cover 106 at the flange 108 that is on the top 109 of the housing 104. The welds 150, 160 join the cover 106 and injector 102 to the housing 104 thermally and mechanically. The welds 150 and 160, which are continuous rather than spot welds, provide a heat conduction path, by which heat energy absorbed by the lower end of the housing from an exhaust stream can be directly conducted into engine coolant flowing through the cavity.

As best seen in FIG. 1, the housing 104 includes a substantially tube-shaped sleeve portion 170, which extends inwardly from the circular output orifice 124 of the housing. The sleeve portion 170 is sized and shaped to provide a clearance fit between it and the exterior surfaces of the output port 126 of the injector 102. The sleeve portion 170 also provides an excellent heat conductor, enabling the diesel exhaust fluid temperature to be determined by engine coolant temperature.

Those of ordinary skill in the art should also recognize from FIG. 3A that the diesel exhaust fluid that flows through the injector travels in essentially a straight line and parallel to the axis 303, at least between the pipe portion of the cover and the output orifice of the housing. The dosing unit 100 thus minimizes mechanical losses that would otherwise be caused by redirecting or rerouting exhaust fluid through the injector.

A method of controlling the temperature of a diesel exhaust fluid injector can be essentially characterized as enclosing the electrically operated exhaust fluid injector into a coolant bath inside a cavity of a housing, the cavity being provided with and coupled to an inlet port and outlet port through which engine coolant can flow. By flowing or pumping coolant through the housing and thus through the cavity, the temperature of the diesel exhaust fluid can be controlled when engine temperatures are high. Similarly, the diesel exhaust fluid can be warmed or heated if necessary by engine coolant, the temperature of which might exceed that of the diesel exhaust fluid. The method of controlling the temperature of a diesel exhaust fluid injector thus necessarily includes flowing or routing a heat transfer fluid into and out of the cavity and around the structures that route or carry diesel exhaust fluid into an engine exhaust stream. In a preferred embodiment, such a heat transfer fluid is engine coolant. Engine coolant is typically made up of a mixture of water and ethylene glycol and equivalents.

The foregoing description is for purposes of illustration only. The true scope of the invention is set forth in the following claims.

What is claimed is:

1. A dosing unit comprising:
   an electrically operated fluid injector, configured to receive a fluid at an input port and additionally configured to eject the fluid from a substantially tube-shaped output port responsive to an electrical signal received at a connector of the fluid injector;
   a liquid-cooled housing having a first interior cavity, a second interior cavity, a coolant input port and a coolant output port, the first interior cavity sized and shaped to receive the electrically operated injector therein and surround the fluid injector in the first interior cavity with engine coolant flowing through the second interior cavity, engine coolant passing through the second interior cavity via the coolant input port and the coolant output port, the liquid-cooled housing having a substantially circular output orifice, sized, shaped and arranged to receive the output port of the fluid injector, the housing including a first metal wall member forming part of an exterior wall of the second interior cavity, the second interior cavity extending to the output port of the fluid injector;
   a cover for the first interior cavity, the cover comprising a pipe configured to carry fluid to the input port of the injector, and a metal cup member covering the input port of the injector and connected to the pipe, the cup member directly contacting the first metal wall member of the housing so as to provide a metal heat-conductive path from at least the cup member to the output port of the fluid injector, the cover being spaced from the second interior cavity;
   a first weld, circumscribing the cover and joining the cover to the first metal wall member of the housing, thermally and mechanically, wherein from the first weld, the first metal wall member extends away from the fluid injector; and
   a second weld, joining said housing to the substantially tube-shaped output port of the fluid injector thermally and mechanically, the second weld circumscribing the output orifice of the housing and circumscribing the tube-shaped output port of the fluid injector.

2. The dosing unit of claim 1, wherein the second interior cavity has a lower portion, which surrounds and is adjacent to the tube-shaped output port of the fluid injector and through which engine coolant flows.

3. The dosing unit of claim 2, wherein the electrically operated fluid injector is a diesel exhaust fluid injector.

4. The dosing unit of claim 2, wherein the electrically operated fluid injector is a fuel injector.

5. The dosing unit of claim 2, wherein, the lower portion of the second interior cavity comprises an inwardly extending, substantially tube-shaped flange, which extends part way into the second interior cavity and wherein the output port of the fluid injector is inside the inwardly extending substantially tubular flange.

6. The dosing unit of claim 5, wherein the second weld is on an exterior surface of the inwardly extending tube-shaped flange of the housing and an exterior surface of the output port of the fluid injector.

7. The dosing unit of claim 5, wherein the liquid-cooled housing further comprises a substantially tube-shaped sleeve portion extending inwardly from the circular output orifice of the liquid cooled housing, the substantially tube-shaped sleeve portion being sized and shaped to receive and contact an exterior surface of the fluid injector.

8. The dosing unit of claim 1, wherein the fluid input port of the fluid injector, the substantially circular output orifice, the pipe of the cover, the first weld and the second weld are substantially centered around a geometric axis, whereby fluid received at the input port of the fluid injector travels in a substantially straight line through the dosing unit.

9. A method of controlling the temperature of a diesel exhaust fluid injector having an output port proximate to an exhaust gas stream, the method comprising:
   enclosing an electrically operated diesel exhaust fluid injector within a housing so that the fluid injector is disposed inside a first cavity of the housing, the housing including a second cavity, a heat transfer fluid input port and a heat transfer fluid output port by which a heat transfer fluid can pass through the second cavity, the diesel exhaust fluid injector having a diesel exhaust fluid input port and configured to eject the diesel exhaust fluid from a substantially tube-shaped output port, which is also inside the first cavity and proximate to an exhaust gas stream, responsive to an electrical signal received at a connector of the fluid injector; and
   flowing the heat transfer fluid into and out of the second cavity and around the tube-shaped output port,
   wherein the housing includes a first metal wall member forming part of an exterior wall of the second cavity, the second cavity extending to the output port of the fluid injector, and the enclosing further comprises enclosing the diesel exhaust fluid injector within the first cavity by covering the diesel exhaust fluid injector with a cover, the cover providing fluid communication to the diesel exhaust fluid input port and directly contacting the first metal wall member, and welding the cover to the first metal wall member so as to form a first weld connection therebetween, and
   wherein the cover, the weld connection, and the first metal wall member form at least part of a metal, heat-conductive path from the cover to the output port of the diesel exhaust fluid injector, and wherein from the first weld connection, the first metal wall member extends away from the fluid injector.

10. The method of claim 9, wherein the housing further comprises a second metal wall member forming an interior wall of the second cavity and extending from the first metal wall member to the output port of the diesel exhaust fluid injector such that the second metal wall member forms part of the metal, heat-conductive path, the method further comprises: welding the output port of the diesel exhaust fluid injector to the housing to form a second weld connection therebetween, the first and second weld connections extending the metal, heat-conductive path between the heat transfer fluid input port, the heat transfer fluid output port, and between the cover and the output port of the diesel exhaust fluid injector.

11. The dosing unit of claim 1, wherein the housing further comprises a second metal wall member forming an interior wall of the second interior cavity, the second metal wall member directly contacting the first metal wall member and forming part of the metal heat-conductive path.

12. The dosing unit of claim 11, wherein the second metal wall member extends from the first metal wall member to the output port of the fluid injector.

13. The dosing unit of claim 12, wherein the second metal wall member directly contacts the output port of the fluid injector.

14. The dosing unit of claim 13, wherein the first weld forms part of the metal heat-conductive path.

15. The dosing unit of claim 14, wherein the second weld forms part of the metal heat-conductive path.

16. A dosing unit comprising:
an electrically operated fluid injector having an input port and an output port, configured to receive a fluid at the input port and additionally configured to eject the fluid from the output port, the output port being a substantially tube-shaped output port;
a liquid-cooled housing having a first interior cavity, a second interior cavity, a coolant input port and a coolant output port, the first interior cavity sized and shaped to receive the fluid injector therein and surround the fluid injector in the first cavity with coolant flowing through the second interior cavity, the coolant passing through the second interior cavity via the coolant input port and the coolant output port, the liquid-cooled housing having a substantially circular output orifice, sized, shaped and arranged to receive the output port of the fluid injector, the housing including a first metal wall member forming part of an exterior wall of the second interior cavity, the second interior cavity extending to the output port of the fluid injector;
a pipe configure to carry fluid towards the input port of the injector;
a cover for the first interior cavity, the cover comprising a metal cup member spaced from the second interior cavity, covering the input port of the fluid injector and connected to the pipe for providing the fluid from the pipe to the input port of the fluid injector, the cup member directly contacting the first metal wall member of the housing so as to provide a metal heat-conductive path from at least the cup member to the output port of the fluid injector;
a first weld, circumscribing the cover and joining the cover to the first wall member of the housing thermally and mechanically; and
a second weld, joining the housing to the substantially tube-shaped output port of the fluid injector thermally and mechanically, the second weld circumscribing the output orifice of the housing and circumscribing the tube-shaped output port of the fluid injector, the first and second welds forming part of the metal heat-conductive path, and from the first weld, the first metal wall member extends away from the fluid injector.

17. The dosing unit of claim 16, wherein the housing further comprises a second metal wall member forming an interior wall of the second interior cavity, the second metal wall member directly contacting the first metal wall member such that the second metal wall member forms part of the metal heat-conductive path, and the second metal wall member extends from the first metal wall member to the output port of the fluid injector.

18. The dosing unit of claim 17, wherein an inner surface of the second metal wall member directly contacts an outer surface of the output port of the fluid injector.

* * * * *